United States Patent
Schweizer

[15] 3,687,509
[45] Aug. 29, 1972

[54] SHAFT BEARING ASSEMBLY HAVING INTERCHANGEABLE PARTS

[72] Inventor: Max Norman Schweizer, 110 S. Clinton Ave., Bay Shore, N.Y. 11706

[22] Filed: Dec. 9, 1970

[21] Appl. No.: 96,482

[52] U.S. Cl.................................308/72, 308/238
[51] Int. Cl...............................................F16c 23/00
[58] Field of Search..........................................308/72

[56] References Cited

UNITED STATES PATENTS

| | | | |
|---|---|---|---|
| 3,539,234 | 11/1970 | Rapata | 308/238 |
| 2,350,482 | 6/1944 | Venditty | 308/72 |
| 2,711,352 | 6/1955 | Hasko et al. | 308/72 |
| 3,106,991 | 10/1963 | Winge | 308/72 |
| 3,301,610 | 7/1967 | Packett et al. | 308/72 |
| 3,439,964 | 4/1969 | Stone et al. | 308/72 |

FOREIGN PATENTS OR APPLICATIONS 815,685  7/1959  Great Britain...............308/72

*Primary Examiner*—Martin P. Schwadron
*Assistant Examiner*—Frank Susko
*Attorney*—Edward H. Loveman

[57] ABSTRACT

A shaft bearing assembly includes a housing having a body portion formed with an axial bore having sections of different diameters to receive shaft bearing inserts of different diameters. One bearing insert is spherically curved and acts as a self-aligning bearing for a shaft rotatable therein. A retainer ring and socket ring insert are provided for the self-aligning insert. Another insert is formed with a curved abutment to serve as an end thrust bearing for the shaft engaged in the self-aligning bearing. A further insert has both spherical and cylindrically curved portions to seat in the housing without other retainer members. The housing and insert may be made of a molded resin material and have smooth, self-lubricated surfaces.

6 Claims, 19 Drawing Figures

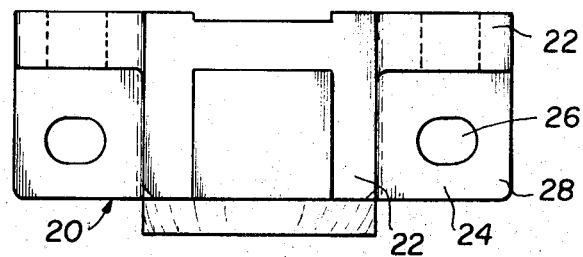
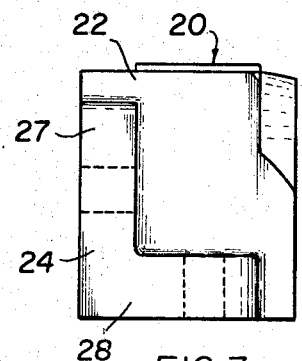
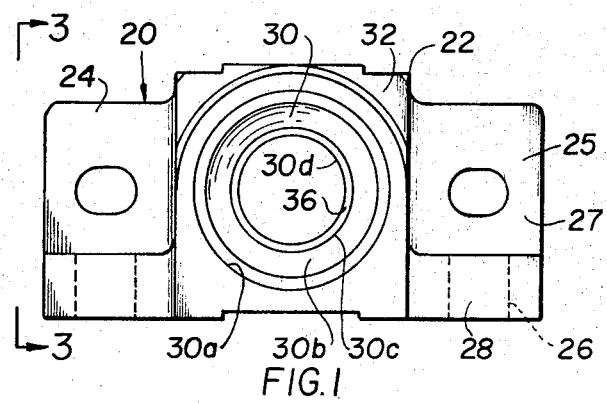
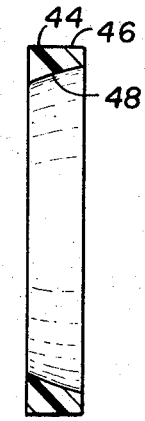
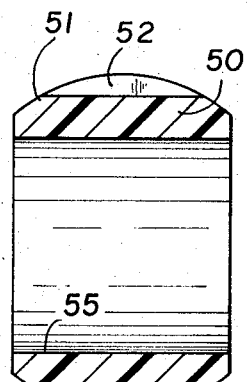
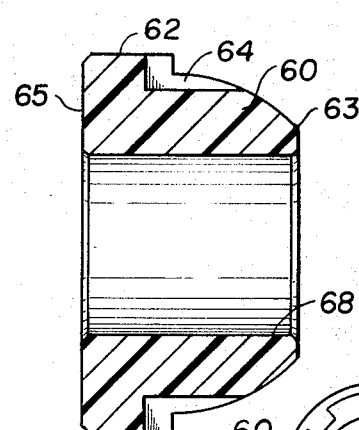
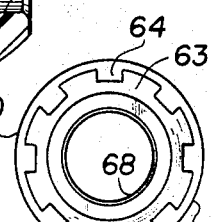
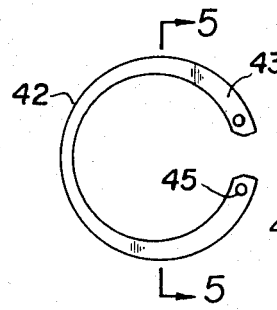
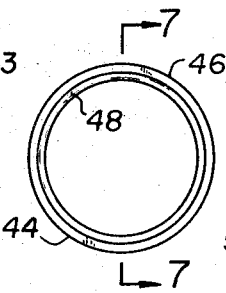
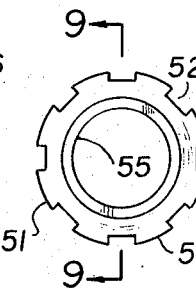
INVENTOR.
MAX NORMAN SCHWEIZER
BY Edward H. Loveman
ATTORNEY

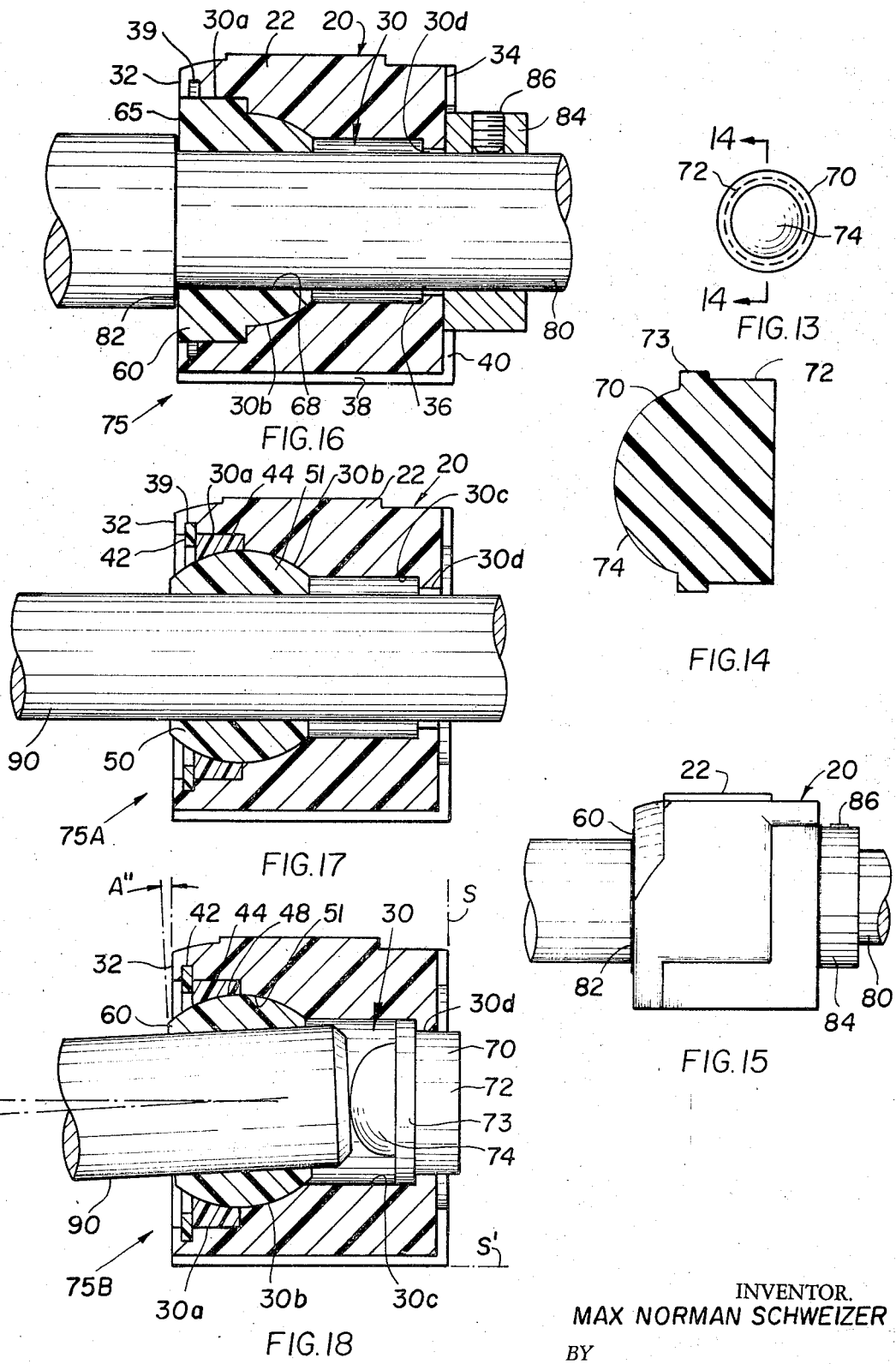

SHAFT BEARING ASSEMBLY HAVING INTERCHANGEABLE PARTS

This invention concerns a shaft bearing assembly and more specifically concerns a shaft bearing assembly having interchangeable parts such that the shaft may be journaled in various way depending on its orientation and operating function.

Shaft journal bearings heretofore have had a fixed construction designed for a particular application. This requires the manufacture and stocking of different journal bearings for each different application. The present invention involves a shaft journal bearing assembly of modular construction whereby parts may be inserted, removed or replaced depending on the particular functions to be performed by the shaft. As examples, the bearing assembly may serve as an end thrust bearing, as a fixed through bearing, or as a self-aligning bearing. Arrangements are also possible to accommodate a shaft rotating on a fixed axis or on a pivotable axis.

The versatility of the present invention is made possible by its modular construction. According to the invention there is provided a housing as pillow block having a bore formed with cylindrical sections of different diameter and which are arranged to accommodate selectively and removably and end thrust insert, a journal bearing insert, a self-aligning bearing insert, a socket ring and a retainer ring. The several parts are made of tough, hard, resin plastic material having inherently smooth, highly polished surfaces which are in effect permanently self-lubricated. The parts may be made selectively of Nylon Delrin, or other synthetic resins useful in forming mechanical bearing parts.

It is therefore a principal object of the present invention to provide a bearing assembly of modular construction.

Another object of the present invention is to provide a bearing assembly comprised of a housing and a plurality of different inserts for journaling of the shaft in various applications.

A further object of the present invention is to provide a bearing assembly of the type described wherein the housing is formed with cylindrical sections of different diameters for accommodating different inserts.

These and other objects and many of the attendant advantages of this invention will be readily appreciated as the same becomes better understood by reference to the following detailed description when considered in connection with the accompanying drawings in which:

FIG. 1 is a front elevational view of a housing or pillow block used in the bearing assembly according to the invention;

FIG. 2 is a top plan view of the pillow block;

FIG. 3 is an end elevational view taken along line 3—3 of FIG. 1;

FIG. 4 is a side elevational view of a flexible retainer ring;

FIG. 5 is an enlarged cross-sectional view taken along line 5—5 of FIG. 4;

FIG. 6 is a side elevational view of an insert;

FIG. 7 is an enlarged cross-sectional view taken along line 7—7 of FIG. 6;

FIG. 8 is a side elevational view of a self-aligning bearing insert;

FIG. 9 is an enlarged cross-sectional view taken along line 9—9 of FIG. 8;

FIG. 10 is a front side elevational view of a journal bearing insert;

FIG. 11 is an enlarged cross-sectional view taken along line 11 of FIG. 10.

FIG. 12 is a rear side elevational view of the journal bearing insert;

FIG. 13 is a side elevational view of an end thrust bearing insert.

FIG. 14 is an enlarged cross-sectional view taken along lines 14—14 of FIG 13;

FIG. 15 is a side elevational view of one bearing assembly employing a fixed journal bearing insert for a shaft with shoulder and collar;

FIG. 16 is an enlarged longitudinal sectional view of the bearing assembly of FIG. 15;

FIG. 17 is a longitudinal sectional view similar to FIG. 16, of a bearing assembly employing a self-aligning insert and a straight through shaft;

FIG. 18 is a longitudinal sectional view similar to FIGS. 16 and 17 of a bearing assembly employing a self-aligning insert and an end thrust bearing insert;

Figure 19:
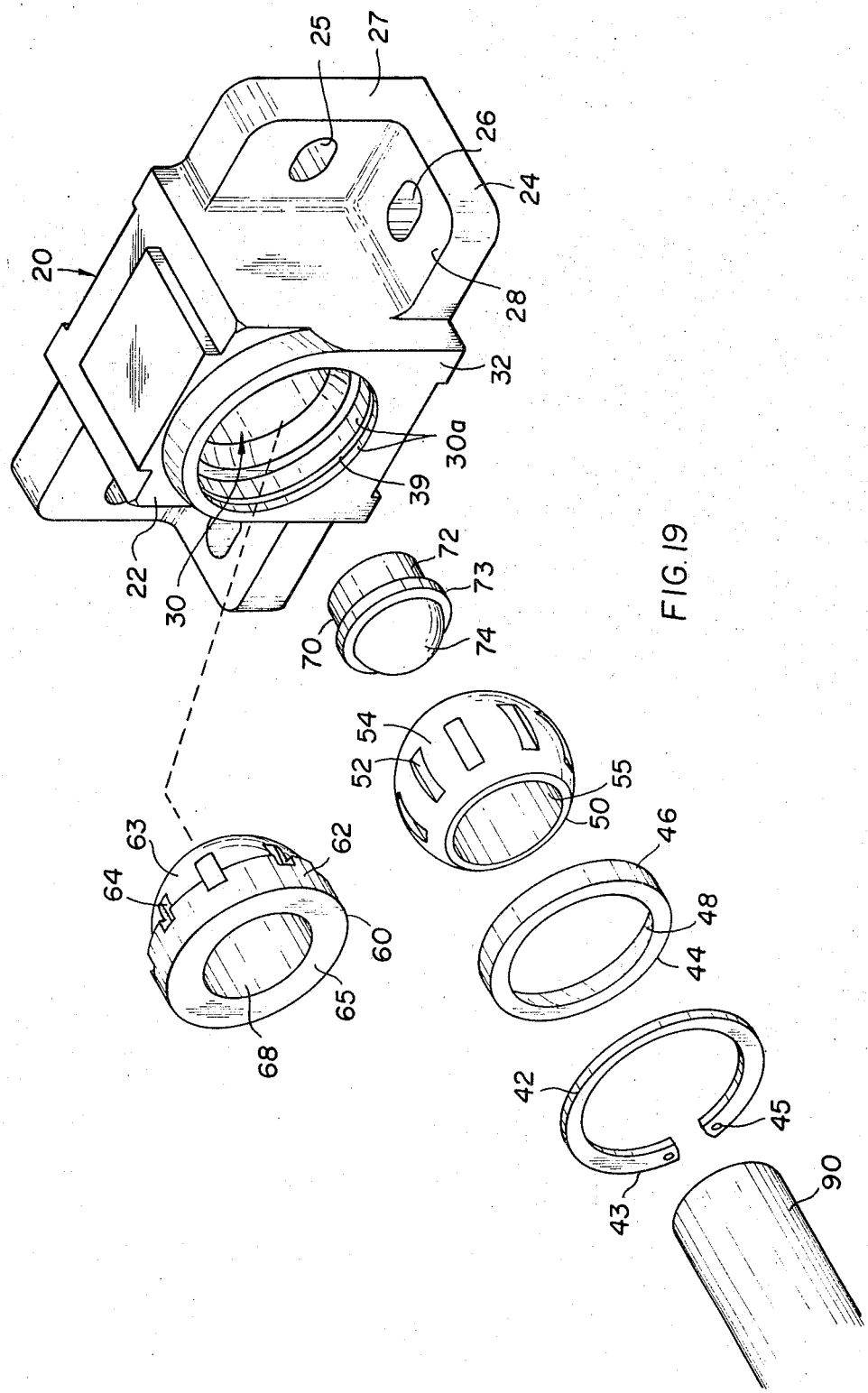
FIG. 19 is an exploded perspective view of parts of the bearing assemblies shown in FIGS. 16, 17 and 18.

Referring now to the drawings wherein like reference characters designate like or corresponding parts throughout, there is illustrated in FIGS. 1, 2, 3, and 19 a bearing housing or pillow block generally designated as reference numeral 20 which is employed in all of the bearing assemblies. This block has a rectangular body 22 formed with lateral integral right angle brackets 24 which may have slots 25, 26 provided in mutually perpendicular walls 27, 28 of each bracket to receive bolts mounting the pillow block 20 on a support respectively perpendicular and parallel to the axis of a bore 30 formed in the body 22. The bore 30 as best shown in FIGS. 1 and 16–18 has a plurality of adjoining sections of different diameter. Section 30a at a front face 32 of the body 22 or at the left end as viewed in FIGS. 16–18 is cylindrical and tapering inwardly thereof is a bore section 30b whose surface is spherically curved. Adjacent the section 30b is a cylindrical section 30c of smaller diameter than that of the section 30a and adjacent thereto at a rear face 34 or right end as viewed in FIGS. 16–18 is a narrow smaller section 30d defining an annular shoulder or seat 36. If desired a pair of wall extensions indicated as numerals 38 and 40 in FIG 16 may be provided beneath and behind the body 22 to serve as spacers for the body 22 when the pillow block 20 is mounted on a support.

In the section 30a of the bore 30 is a circumferential slot or groove 39 which receives a conventional "C" ring 42 as best shown in FIGS 4, 5, and 19. This ring is wider radially than the depth of the groove 39 to serve as a retainer ring for a socket ring insert 44 (see FIGS. 17 and 18). The "C" ring 42 has widened ends 43 formed with holes 45 which project radially out of the groove 38 and which may be engaged by a tool for removing the ring. The socket ring 44 shown most clearly in FIG. 7 is an annular member having a cylindrical outer surface 46 to fit snugly in the bore section 30a. The inner surface 48 of the insert 44 is spherically curved to receive a self-aligning insert 50. This insert as best shown in FIGS. 8 and 9 has an external surface 51 which is spherically curved and which fits snugly in the bore section 30b (FIG. 17). The insert 50 may pivot in planes diametrically intersecting the bore 30 but in general will not rotate in the bore section 30b due to the snug frictional fit. Spaced external axial grooves 52 are formed in the insert 50 for permitting axial flow of air for cooling purposes and also to define fingers 54 therebetween which effectively grip the inside of the bore section 30b. The insert 50 has an internal cylindrical bore 55 for receiving a journal portion of a rotatable shaft illustrated in FIGS. 10, 11 and 12 is formed with an external cylindrical surface section 62 which fits snugly in bore section 30a and with an adjoining spherically curved surface section 63 which fits snugly in spherically curved bore section 30b. The insert 40 has a flat end face 65 and axially extending external grooves 64 permit air flow for cooling purposes and define fingers therebetween so that the insert 60 effectively grips the interior surface of the bore sections 30a and 30b. When the insert 60 is inserted in the pillow block (20) as shown in FIG. 16, the retainer "C" ring 42 and the socket ring insert 44 are omitted. Insert 60 is formed with an internal cylindrical bore 68 to receive the journal portion of a rotatable shaft.

An end thrust bearing insert 70 is shown in FIGS. 13, and 14 and is solid, imperforate member with a cylindrical end portion 72 for fitting snugly in the bore section 30d. As most clearly illustrated in FIGS. 18 and adjoining annular flange 73 of the insert 70 fits snugly in the bore section 30c and bears against the shoulder or seat 36. Opposite the cylindrical end portion 72 is a spherically curved centrally located knob 74 facing inwardly of the bore 30 to serve as an end abutment for a shaft rotatably engaged in the self-aligning insert 50 or the journal bearing insert.

FIGS. 15 and 16 show a bearing assembly generally designated by reference numeral 75 which includes the pillow block 20 and the journal bearing insert 60. A shaft 80 is journaled in the bearing insert 60 and is formed with a shoulder 82 juxtaposed to an end face 65 of the insert 60 and an end face 32 of the pillow block 20. A collar 84 contains a set screw 86 which bears on the shaft 80 at the opposite end face 34 of the pillow block 20. The shaft 80 rotates freely in coaxial alignment with the axis of bore 30 and insert 60. As shown by broken lines in FIG. 19, the bearing insert 60 may be inserted in the pillow block 20 in place of the insert 50.

FIG. 17 shows a bearing assembly 75A wherein the pillow block 20 contains the self-aligning insert 50 which rotatably supports a shaft 90 which extends axially through the pillow block 20. The insert 50 is held in place by the socket ring insert 44 which in turn is held in place by the retainer "C" ring 42.

FIG. 18 shows a bearing assembly 75B which is similar to the assembly 75A but further includes the end thrust bearing insert 70 at the right of the bore 30. Here the end of shaft 90 which is journaled in the self-aligning insert 50 bears against the knob 74 of the insert 70. Since the self-aligning insert is pivotable in planes diametral of and including the axis of the bore 30 the shaft 90 may be shifted angularly, for example through angle A' as indicated in FIG. 18. The self-aligning insert will pivot through a corresponding angle A''. The Knob 74 of the insert 70 will abut the end of the shaft 90 in all angular orientations of shaft 90, so that the insert serves as an end thrust bearing. The pillow block 20 will preferably be secured to mutually perpendicular surfaces S and S' by bolts inserted through the angle brackets 24. The assembly of parts is shown in FIG. 19 in exploded form.

It will be noted that any one or more inserts can be employed in the pillow block 20 depending on the journal bearing functions to be performed. Parts may readily be replaced and interchanged with others having internal bores of different sizes to accommodate shafts of different diameters. Parts may be interchanged to change the bearing assembly from a through journal bearing to an end thrust bearing or to a shoulder bearing.

It will further be noted that all parts are molded of a smooth, slippery resin plastic material so that no lubrication is required. The parts will not rust or corrode and are dimensionally stable, and resist chemical decomposition and wear. They will not crack, splinter or bind and are light in weight and easily assembled without use of any special tools or machinery, and without requiring any particular mechanical skills. Dealers and users can stock individual parts to be made up into assemblies as may be specified with the assurance that the assemblies will provide long, trouble-free, reliable service.

It should be understood that the foregoing relates to only preferred embodiments of the invention, and that it is intended to cover all changes and modifications of the examples of the invention herein chosen for the purposes of the disclosure, which do not constitute departures from the spirit and scope of the invention.

The invention claimed is:

1. A shaft bearing assembly for supporting a shaft comprising
    a housing having a body formed with an axial bore having a plurality of mutually adjacent sections of different diameters for receiving shaft bearing inserts of different diameters respectively;
    a shaft bearing insert snugly fitted in one of said sections of said bore for rotatably supporting said shaft, said housing and said insert being made of a molded resin material forming smooth, self-lubricated bearing surfaces; and
    retaining means comprising a circumferential groove formed in said bore and a retainer ring removably disposed in said groove for removably retaining said insert in said bore.

2. A shaft bearing assembly as defined in claim 1, wherein said housing has integrally formed apertured bracket sections for securing said housing to a stationary support.

3. A shaft bearing assembly as defined in claim 1, wherein one of said sections of said bore is spherically curved, and wherein said shaft bearing insert has a correspondingly spherically curved external surface portion to fit snugly in said one section of said bore.

4. A shaft bearing assembly as defined in claim 1, wherein said insert has an internal cylindrically curved surface for rotatably supporting a journal portion of said shaft.

5. A shaft bearing assembly as defined in claim 4, further comprising a socket ring insert engaged in another section of said bore, said socket ring insert having an internal spherically curved surface slidably engaging said curved external surface of the first named insert.

6. A shaft bearing assembly as defined in claim 5, wherein said retainer ring is removably engaged in said bore adjacent to said socket ring insert.

* * * * *